(12) United States Patent
Broch

(10) Patent No.: US 8,494,485 B1
(45) Date of Patent: Jul. 23, 2013

(54) MANAGEMENT OF CERTIFICATES FOR MOBILE DEVICES

(75) Inventor: Josh Glenn Broch, Cupertino, CA (US)

(73) Assignee: Mobile Iron, Inc., Mountain View, CA (US)

( * ) Notice: Subject to any disclaimer, the term of this patent is extended or adjusted under 35 U.S.C. 154(b) by 0 days.

(21) Appl. No.: 12/976,402

(22) Filed: Dec. 22, 2010

(51) Int. Cl.
*H04M 1/68* (2006.01)
*H04W 4/00* (2009.01)

(52) U.S. Cl.
USPC .......................................... 455/410; 370/329

(58) Field of Classification Search
USPC .......................................... 455/410, 411, 419
See application file for complete search history.

(56) References Cited

U.S. PATENT DOCUMENTS

| 8,370,428 B1* | 2/2013 | Bayliss et al. | 709/203 |
| 2002/0173296 A1* | 11/2002 | Nordman et al. | 455/414 |
| 2005/0144437 A1* | 6/2005 | Ransom et al. | 713/151 |
| 2005/0164691 A1* | 7/2005 | Payne | 455/419 |
| 2010/0112983 A1* | 5/2010 | Walker et al. | 455/411 |

OTHER PUBLICATIONS

Nystrom et al. PKCS #10: Certification Request Syntax Specification Version 1.7. The Internet Society. Nov. 2000.
Cisco Systems' Simple Certificate Enrollment Protocol draft-nourse-scep-20, Cisco Systems, Internet Engineering Task Force, Nov. 30, 2009.
Apple Inc., iPhone in Business Over-the-Air Enrollment and Configuration, Jun. 2009.

* cited by examiner

*Primary Examiner* — Michael Faragalla
(74) *Attorney, Agent, or Firm* — Van Pelt, Yi & James LLP

(57) ABSTRACT

One embodiment of the present disclosure provides a method that includes accessing, by a mobile device management system, a profile for a mobile device. The method also includes negotiating, by the mobile device management system, with a certificate authority to obtain a certificate for the mobile device. The negotiating with the certificate authority includes imitating the mobile device based on the profile. The negotiating with the certificate authority also includes, based at least on the imitation, transmitting one or more certificate enrollment messages to the certificate authority. The negotiating with the certificate authority further includes, based on the one or more messages, receiving, at the mobile device management system, the certificate for the mobile device. The method further includes transmitting the certificate to a control agent hosted on the mobile device for installation.

27 Claims, 4 Drawing Sheets

MANAGEMENT OF CERTIFICATES FOR MOBILE DEVICES

TECHNICAL FIELD

This disclosure relates generally to mobile devices and management systems and, more particularly, to managing certificates for mobile devices.

BACKGROUND

In a manner similar to personal computers and laptops, business enterprises increasingly rely on mobile and handheld devices. Indeed, the capabilities and uses of mobile devices have moved beyond voice communications and personal information management applications to a variety of communications- and business-related functions including email, browsing, instant messaging, enterprise applications, and video applications. For example, the functionality of many mobile devices have been extended to include cellular and wireless local area network (WLAN) communications interfaces, as well as virtual private network (VPN) and other client applications. Furthermore, mobile devices used in enterprises may also include enterprise applications used by employees in the field or otherwise.

Deployment, management and configuration of mobile and handheld devices in enterprise environments, however, present certain challenges. For example, the vast and constantly changing variety of mobile device types, functions and capabilities presents challenges to configuration, provisioning and troubleshooting. Moreover, the number and variety of applications that can be installed on mobile devices, as well as the nature of the mobile devices themselves, challenges network administrators relative to network security, deployment and overall management.

DESCRIPTION OF EXAMPLE EMBODIMENTS

Figure 1:
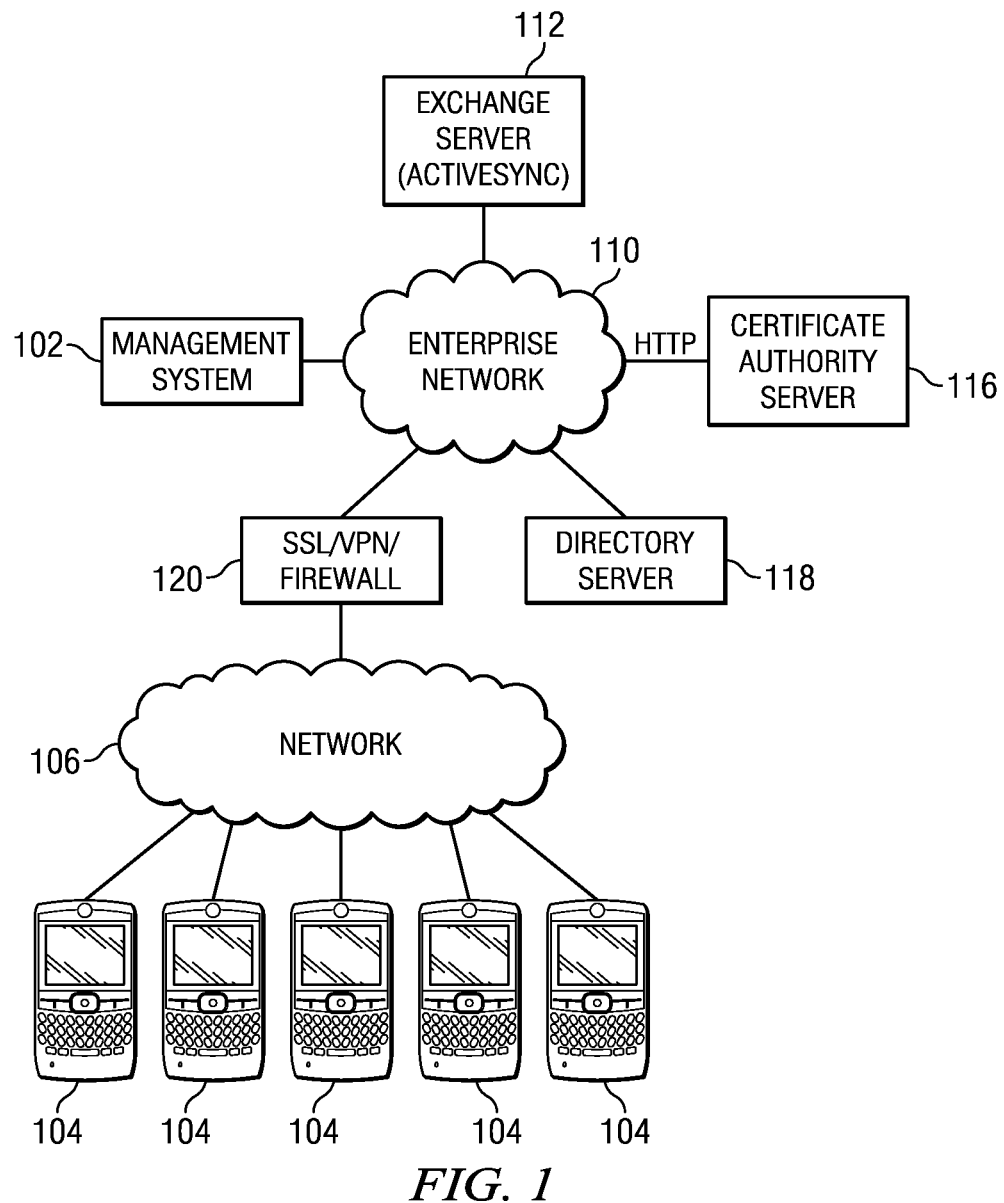
FIG. 1 illustrates an example mobile device management architecture according to an embodiment of the present disclosure.

Particular embodiments of the present disclosure provide methods, apparatuses and systems directed to managing certificates provided to mobile devices for accessing an enterprise environment. In particular, a method includes accessing, by a mobile device management system, a profile for a mobile device. The method also includes negotiating, by the mobile device management system, with a certificate authority to obtain a certificate for the mobile device. The negotiating with the certificate authority includes imitating the mobile device based on the profile. The negotiating with the certificate authority also includes, based at least on the imitation, transmitting one or more certificate enrollment messages to the certificate authority. The negotiating with the certificate authority further includes, based on the one or more messages, receiving, at the mobile device management system, the certificate for the mobile device. The method further includes transmitting the certificate to a control agent hosted on the mobile device for installation.

In particular embodiments, a mobile device management system obtains (by imitating the mobile device) a certificate for the mobile device from a certificate authority. This certificate may enable the mobile device to access various enterprise network services once the certificate is installed on the mobile device. The certificate, however, may only be transmitted to the mobile device if the mobile device is authorized to have (or receive) the certificate. In this manner, a network administrator may control access to enterprise network services and maintain security, while allowing the mobile device 104 to operate with applications that access systems or hosts external to the enterprise network 110, such as calling functions, and third party applications. In one implementation, the certificate is a public key certificate, which is an electronic document that uses a digital signature to bind together a public key with an identity—information such as the name of a person or an organization, their address, a device identifier, and so forth. The certificate asserts that a public key belongs to an individual and/or a mobile device.

In particular embodiments, each mobile device includes a control client application (hereinafter referred to as "control client") that is configured to interact with the device management system and a network link. More particularly, the control client application is configured to receive data, commands, and other messages from the device management system via a network link, to synchronize the state of the mobile device with the corresponding device object stored at the device management database, and to selectively track and upload data over the network link to the device management system and database. In various embodiments, the control client logs man-machine interface (MMI) data, file system commands, and other data characterizing usage of, and/or the actions performed on, the mobile device. Some or all of the log data is provided to the device management application hosted on the device management server, which can synchronize a device object stored at the database with that of the mobile device, and vice versa.

FIG. 1 illustrates a block diagram of a computer network environment 100 in accordance with an example embodiment. Computer network environment 100 includes a device management system 102 and a plurality of mobile devices 104 that may each communicate with device management system 102 via one or more network links 106. In various embodiments, device management system 102 may actually comprise one or more device management servers and device management databases, one or more of which may or may not be physically located within the physical boundaries of the enterprise.

Network link(s) 106 may include any suitable number or arrangement of interconnected networks including both wired and wireless networks. By way of example, a wireless communication network link over which mobile devices 104 communicate may utilize a cellular-based communication infrastructure that includes cellular-based communication protocols such as AMPS, CDMA, TDMA, GSM (Global System for Mobile communications), iDEN, GPRS, EDGE (Enhanced Data rates for GSM Evolution), UMTS (Universal Mobile Telecommunications System), WCDMA and their variants, among others. In various embodiments, network link 106 may further include, or alternately include, a variety of communication channels and networks such as WLAN/WiFi, WiMAX, Wide Area Networks (WANs), and BlueTooth.

As FIG. 1 illustrates, device management system 102 may be operably connected with (or included within) an enterprise network 110 (which may include or be a part of network link(s) 106). Enterprise network 110 may further include one or more of email or exchange servers 112, enterprise application servers 114, certificate authority servers 116, directory servers 118, Virtual Private Network (VPN)/SSL gateways 120, firewalls, among other servers and components. Email or exchange servers 112 may include Exchange ActiveSync (EAS) or other functionality that provides synchronization of contacts, calendars, tasks, and email between ActiveSync-enabled servers and mobile devices. Other synchronization protocols can also be used. The mobile devices 104 may access or utilize one or more of these enterprise systems or associated functionality.

Example System Architectures for Management System and Mobile Devices

Figure 2:
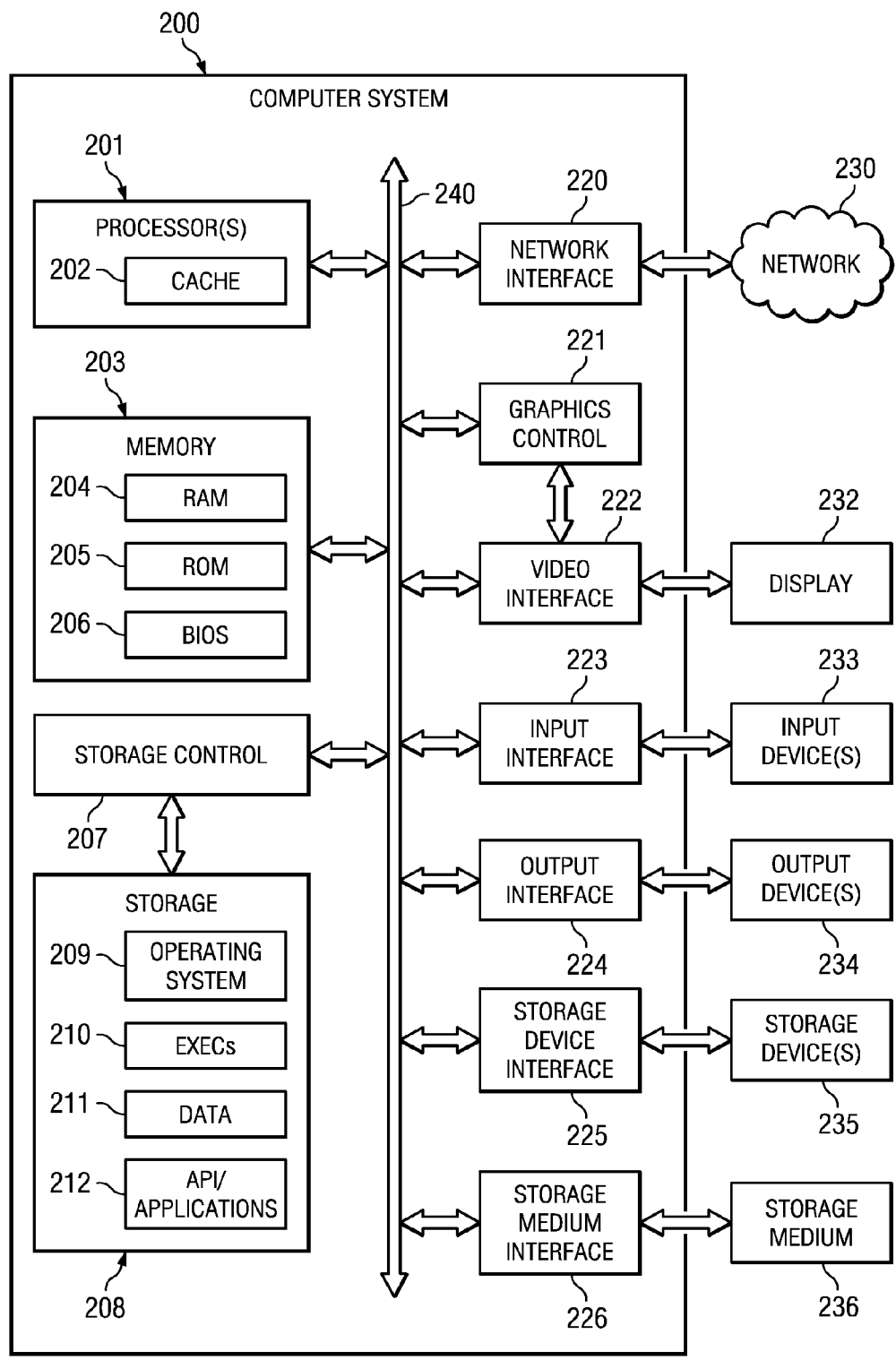
FIG. 2 is a schematic diagram illustrating an example server system architecture.

Device management system 102 may actually include one or more hardware, firmware, and software components residing at one or more computer servers or systems (hereinafter referred to as computer systems). Software components of device management system 102 may be at one or more of the same computer systems. FIG. 2 illustrates an example computer system 200. Device management system 102 may include software components at one or more computer systems, which may be similar to example computer system 200. Particular embodiments may implement various functions of device management system 102 as hardware, software, or a combination of hardware and software. As an example and not by way of limitation, one or more computer systems may execute particular logic or software to perform one or more steps of one or more processes described or illustrated with respect to device management system 102. One or more of the computer systems may be unitary or distributed, spanning multiple computer systems or multiple datacenters, where appropriate.

The present disclosure contemplates any suitable computer system. Herein, reference to logic may encompass software, and vice versa, where appropriate. Reference to software may encompass one or more computer programs, and vice versa, where appropriate. Reference to software may encompass data, instructions, or both, and vice versa, where appropriate. Similarly, reference to data may encompass instructions, and vice versa, where appropriate.

One or more tangible computer-readable media may store or otherwise embody software implementing particular embodiments. A tangible computer-readable medium may be any tangible medium capable of carrying, communicating, containing, holding, maintaining, propagating, retaining, storing, transmitting, transporting, or otherwise embodying software, where appropriate. A tangible computer-readable medium may be a biological, chemical, electronic, electromagnetic, infrared, magnetic, optical, quantum, or other suitable medium or a combination of two or more such media, where appropriate. A tangible computer-readable medium may include one or more nanometer-scale components or otherwise embody nanometer-scale design or fabrication. Example tangible, non-transitory computer-readable media include, but are not limited to, application-specific integrated circuits (ASICs), compact discs (CDs), field-programmable gate arrays (FPGAs), floppy disks, floptical disks, hard disks, holographic storage devices, magnetic tape, caches, programmable logic devices (PLDs), random-access memory (RAM) devices, read-only memory (ROM) devices, semiconductor memory devices, and other suitable computer-readable media.

Software implementing particular embodiments may be written in any suitable programming language (which may be procedural or object oriented) or combination of programming languages, where appropriate. Any suitable type of computer system (such as a single- or multiple-processor computer system) or systems may execute software implementing particular embodiments, where appropriate. A general-purpose or specific-purpose computer system may execute software implementing particular embodiments, where appropriate.

The components in FIG. 2 are examples only and do not limit the scope of use or functionality of any hardware, software, embedded logic component, or a combination of two or more such components implementing particular embodiments. Computer system 200 may have any suitable physical form, including but not limited to one or more integrated circuits (ICs), printed circuit boards (PCBs), mobile handheld devices (such as mobile telephones or PDAs), laptop or notebook computers, distributed computer systems, computing grids, or servers. Computer system 200 may include a display 232, one or more input devices 233 (which may, for example, include a keypad, a keyboard, a mouse, a stylus, etc.), one or more output devices 234, one or more storage devices 235, and various tangible storage media 236.

Bus 240 connects a wide variety of subsystems. Herein, reference to a bus may encompass one or more digital signal lines serving a common function, where appropriate. Bus 240 may be any of several types of bus structures including a memory bus, a peripheral bus, or a local bus using any of a variety of bus architectures. As an example and not by way of limitation, such architectures include an Industry Standard Architecture (ISA) bus, an Enhanced ISA (EISA) bus, a Micro Channel Architecture (MCA) bus, a Video Electronics Standards Association local bus (VLB), a Peripheral Component Interconnect (PCI) bus, a PCI-Express (PCI-X) bus, and an Accelerated Graphics Port (AGP) bus.

Processor(s) 201 (or central processing unit(s) (CPU(s))) optionally contains a cache memory unit 202 for temporary local storage of instructions, data, or computer addresses. Processor(s) 201 are coupled to tangible storage devices including memory 203. Memory 203 may include random access memory (RAM) 204 and read-only memory (ROM) 205. ROM 205 may act to communicate data and instructions unidirectionally to processor(s) 201, and RAM 704 may act to communicate data and instructions bidirectionally with processor(s) 201. ROM 205 and RAM 204 may include any suitable tangible computer-readable media described below. Fixed storage 208 is connected bidirectionally to processor(s) 201, optionally through storage control unit 207. Fixed storage 208 provides additional data storage capacity and may also include any suitable tangible computer-readable media described. Storage 208 may be used to store operating system 209, EXECs 210, data 211, application programs 212, and the like. Typically, storage 208 is a secondary storage medium (such as a hard disk) that is slower than primary storage. Information in storage 208 may, in appropriate cases, be incorporated as virtual memory in memory 203.

Processor(s) 201 is connected to multiple interfaces, such as graphics control 221, video interface 222, input interface 223, output interface 224, storage interface 225, and storage medium interface 226. These interfaces are in turn connected to appropriate devices, as may be illustrated. In general, an input/output (I/O) device may be a video display, a track ball, a mouse, a keyboard, a microphone, a touch-sensitive display, a transducer card reader, a magnetic- or paper-tape reader, a tablet, a stylus, a voice or handwriting recognizer, a biometrics reader, another computer system, or other suitable I/O device or a combination of two or more such I/O devices. Processor(s) 201 may connect to another computer system or to telecommunications network 230 (which may include network link 106 or enterprise network 110) through network interface 220. With network interface 220, CPU 201 may communicate with network 230 in the course of performing one or more steps of one or more processes described or illustrated herein, according to particular needs. Moreover, one or more steps of one or more processes described or illustrated herein may execute solely at CPU 201. In addition or as an alternative, one or more steps of one or more processes described or illustrated herein may execute at multiple CPUs 201 that are remote from each other across network 230.

In particular embodiments, when computer system 200 is connected to network 230, computer system 200 may communicate with other devices, specifically mobile devices 104 and enterprise systems, connected to network 230. Communications to and from computer system 200 may be sent through network interface 220. For example, network interface 220 may receive incoming communications (such as requests or responses from other devices) in the form of one or more packets (such as Internet Protocol (IP) packets) from network 230 and computer system 200 may store the incoming communications in memory 203 for processing. Computer system 200 may similarly store outgoing communications (such as requests or responses to other devices) in the form of one or more packets in memory 203 and communicated to network 230 from network interface 220. Processor(s) 201 may access these communication packets stored in memory 203 for processing.

Computer system 200 may provide functionality as a result of processor(s) 201 executing software embodied in one or more tangible computer-readable storage media, such as memory 203, storage 208, storage devices 235, and/or storage medium 236. The computer-readable media may store software that implements particular embodiments, and processor(s) 201 may execute the software. Memory 203 may read the software from one or more other computer-readable media (such as mass storage device(s) 235, 236) or from one or more other sources through a suitable interface, such as network interface 220. The software may cause processor(s) 201 to carry out one or more processes or one or more steps of one or more processes described or illustrated herein. Carrying out such processes or steps may include defining data structures stored in memory 203 and modifying the data structures as directed by the software. In addition or as an alternative, computer system 200 may provide functionality as a result of logic hardwired or otherwise embodied in a circuit, which may operate in place of or together with software to execute one or more processes or one or more steps of one or more processes described or illustrated herein. Herein, reference to software may encompass logic, and vice versa, where appropriate. Moreover, reference to a computer-readable medium may encompass a circuit (such as an IC) storing software for execution, a circuit embodying logic for execution, or both, where appropriate. The present disclosure encompasses any suitable combination of hardware, software, or both.

In particular embodiments, a mobile device 104 is a wireless phone such as a mobile or cellular phone. By way of example, mobile device 104 may be a smartphone (e.g., the iPhone or iPhone 3G manufactured by Apple Inc. of Cupertino, Calif., the BlackBerry manufactured by Research in Motion (RIM), the G1 based on the Android operating system, or Samsung BlackJack based on the Windows Mobile operating system), feature phone, basic cellular phone, personal digital assistant, or other multimedia device. Additionally, mobile device 104 may be affiliated with and supported by any suitable carrier or network service provider such as, by way of example, Sprint PCS, T-Mobile, Verizon, AT&T, or other suitable carrier.

Figure 3:
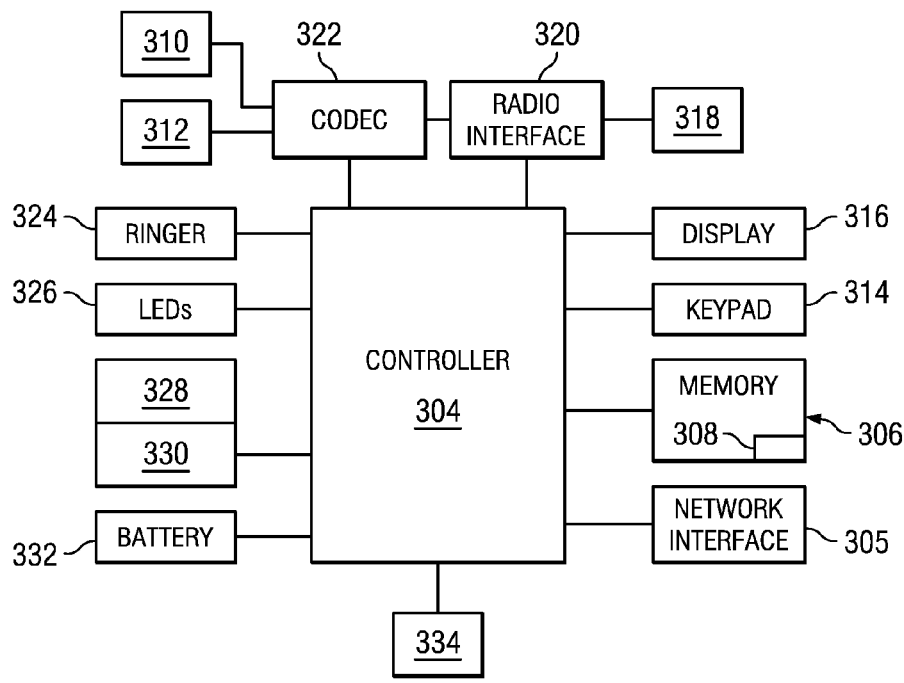
FIG. 3 is a schematic diagram illustrating an example mobile device system architecture.

FIG. 3 shows a schematic representation of the main components of an example mobile device 104, according to various particular embodiments, which is adapted for use in connection with a GSM network or any other mobile telephone network as described above, and which may also be configured to meet the wireless application protocol specification (WAP). Mobile device 104 generally includes a controller 304 which may comprise a microcontroller or one or more processors configured to execute instructions and to carry out operations associated with mobile device 104. In various embodiments, controller 304 may be implemented as a single-chip, multiple chips and/or other electrical components including one or more integrated circuits and printed circuit boards. Controller 304 may optionally contain a cache memory unit for temporary local storage of instructions, data, or computer addresses. By way of example, using instructions retrieved from memory, controller 304 may control the reception and manipulation of input and output data between components of mobile device 104.

Controller 304 together with a suitable operating system may operate to execute instructions in the form of computer code and produce and use data. By way of example and not by way of limitation, the operating system may be Windows-based, Mac-based, or Unix or Linux-based, or Symbian-based, among other suitable operating systems. The operating system, other computer code (including control client 308 described below) and/or data may be physically stored within a memory block 306 that is operatively coupled to controller 304.

Memory block 306 encompasses one or more storage mediums and generally provides a place to store computer code (e.g., software and/or firmware) and data that are used by mobile device 104. By way of example, memory block 306 may include various tangible computer-readable storage media including Read-Only Memory (ROM) and/or Random-Access Memory (RAM). As is well known in the art, ROM acts to transfer data and instructions uni-directionally to controller 304, and RAM is used typically to transfer data and instructions in a bi-directional manner. Memory block 306 may also include one or more fixed storage devices in the form of, by way of example, solid-state hard disk drives (HDDs), among other suitable forms of memory coupled bi-directionally to controller 304. Information may also reside on a removable storage medium loaded into or installed in mobile device 104 when needed. By way of example, any of a number of suitable memory cards may be loaded into mobile device 104 on a temporary or permanent basis. By way of example, mobile device 104 may also include a subscriber identification module (SIM) card 328 and a SIM card reader 330.

Controller 304 is also generally coupled to a variety of interfaces such as graphics control, video interface, input interface, output interface, and storage interface, and these interfaces in turn are coupled to the appropriate devices. Controller 304 is also coupled to a network interface 305 that allows mobile device 104, and particularly controller 304, to be coupled to another computer (e.g., device management system 102) or telecommunications network (e.g., network link 106 or enterprise network 110). More particularly, network interface 305 generally allows controller 304 to receive information from network link 106, or might output information to the network link in the course of performing various method steps described below. Communications may be sent to and from mobile device 104 via network interface 305. By way of example, incoming communications, such as a request or a response from another device (e.g., device management system 102), in the form of one or more packets, may be received from network link 106 at network interface 305 and stored in selected sections in memory block 306 for processing. Outgoing communications, such as a request or a response to another device (e.g., device management system 102), again in the form of one or more packets, may also be stored in selected sections in memory 306 and sent out to network link 106 at network interface 305. Controller 304 may access these communication packets stored in memory 306 for processing.

Electric signals (e.g., analog) may be produced by microphone 310 and fed to earpiece 312. Controller 304 may receive instruction signals from keypad 314 (which may include soft keys) and control the operation of display 316 (In alternate embodiments, keypad 314 may be implemented as a virtual keypad displayed on display 316). By way of example, display 316 may incorporate liquid crystal display (LCD), light emitting diode (LED), Interferometric modulator display (IMOD), or any other suitable display technology. Radio signals may be transmitted and received by means of an antenna 318 that may be connected through a radio interface 320 to codec 322 configured to process signals under control of controller 304. Thus, in use for speech, codec 322 may receive signals (e.g., analog) from microphone 310, digitize them into a form suitable for transmission, and feed them to radio interface 320 for transmission through antenna 318 to, for example, a public land mobile network (PLMN). Similarly, received signals may be fed to codec 322 so as to produce signals (e.g., analog) which may be fed to ear piece 312. Mobile device 104 also generally includes a ringer (e.g., speaker) 324 and may also include light emitting diodes (LEDs) 326. In particular embodiments, mobile device 104 may be a dual mode phone having a wireless local area network (WLAN) interface, Worldwide Interoperability for Microwave Access (WiMAX) interface, and/or other wireless or physical interfaces (such as BlueTooth® and USB). Additionally, mobile device 104 may be powered by a removable battery pack 332.

Mobile device 104 may also include one or more user input devices 334 (other than keypad 314) that are operatively coupled to the controller 304. Generally, input devices 334 are configured to transfer data, commands and responses from the outside world into mobile device 108. By way of example, mobile device may include a joystick or directional pad. Input devices 334 may also include one or more hard buttons.

Display device 316 is generally configured to display a graphical user interface (GUI) that provides an easy to use visual interface between a user of the mobile device 104 and the operating system or application(s) running on the mobile device. Generally, the GUI presents programs, files and operational options with graphical images. During operation, the user may select and activate various graphical images displayed on the display 316 in order to initiate functions and tasks associated therewith.

In particular embodiments, each mobile device 104 includes a control client 308 that is configured to interact with the device management system 102 via network link 106. Control client 308 may generally be implemented as one or more software programs or applications stored in, by way of example, memory 306. Control client 308 is configured to receive data, commands, and other messages from the device management system 102 via network link 106, to synchronize the state of the mobile device 104 with a corresponding mobile device profile object stored at a device management database (such as a Lightweight Directory Access Protocol (LDAP) database or directory), and to selectively track and upload data over the network link to the device management system for logging by the device management system, as will be described in detail below. The logged data may include particular files (e.g., documents, spreadsheets, pdfs, pictures, etc.) stored in the mobile device as well particular application usage data in the form of, by way of example, activity data (e.g., data regarding calls, messages, and email), content data (e.g., the text within the message or email body), and/or context data (e.g., timestamps and location data, etc.), as will be described in more detail below. In various embodiments, the control client logs man-machine interface (MMI) data, file system commands, and other data characterizing usage of, and/or the actions performed on, the mobile device.

Some or all of the log data is provided to the device management application hosted on the device management system 102, which can synchronize a device object stored at the database with that of the mobile device, and vice versa.

In particular embodiments, device management system 102 is configured to selectively log data from each of the mobile devices 104 of an enterprise. More particularly, mobile device 104 may be configured to selectively track and/or log data and to upload this data to device management system 102 which, in turn, selectively logs or stores the data. In particular embodiments, each mobile device 104 is first registered with the device management system 102 by creating and storing a device object for the mobile device within the device management system 102. By way of example, an employee desiring to use a personally owned mobile device 104 may indicate to management that he or she desires to use the personally owned mobile device 104 with enterprise related services (e.g., email or access to an enterprise database) and needs enterprise access. Alternately, an employee receiving a mobile device 104 under a corporate liable plan may receive an enterprise owned mobile device 104 upon commencing employment or receiving a mobile device upgrade, by way of example. In particular embodiments, registering a mobile device 104 with the device management system 102 includes creating and storing a device object in a database within or connected with device management system 102. The device object may be implemented as part of a data structure corresponding to the particular mobile device 104. By way of example, a particular device object may include a device identifier that uniquely identifies the corresponding mobile device.

In particular embodiments, the database within or connected with device management system 102 stores resources associated with the mobile devices 104. By way of example, each resource may store a particular file, or generally a data structure, as well as corresponding metadata. Each mobile device 104 also stores (e.g., within memory 306) a number of resources each storing a file or data structure and corresponding metadata. In particular embodiments, when control client 308 determines that a particular file or other data structure (hereinafter referred to as "file") has been newly stored, updated, or otherwise modified within mobile device 104, control client 308 creates a hash for the particular file and causes mobile device 104 to transmit the hash to device management system 102. Upon receipt of the hash, device management system 102 determines if the particular file corresponding to the hash (and the file in the mobile device 104) is already stored in one of the resources stored within device management system 102. In particular embodiments, if device management system 102 determines that the resource already exists, the device management system 102 creates a new resource link to the resource and stores or otherwise associates the new resource link with the device object corresponding to the mobile device 104.

In particular, various embodiments enable selective erasing, tagging, copying, moving, modifying, viewing, and/or other selective action on or of particular data stored in a particular registered mobile device or designated group of mobile devices via the device management system 102.

The device management system 102 may operate in connection with control clients 308 to discover the applications installed on mobile devices 104. Users may install applications on their respective mobile devices 104 by accessing a web site directly on the mobile device for example. A control client 308 may detect application installs and transmit notifications of such events to device management system 102. In other implementations, control client 308 may transmit log data from which application installs on one or more mobile devices 104 may be detected. In other implementations, control client 308 may periodically generate a list of applications installed on a management mobile device 104 and transmit the list to device management system 102. With some mobile platforms, control client 308 may obtain a list of installed applications using published APIs supported by the operating systems of the mobile devices 104. More generally, a control client 308 may also monitor for events and/or log data that is relevant to a security profile of a mobile device 104. For example, control client 308 can be configured to report on Subscriber Identity Module (SIM) card changes on the mobile device 104. Control client 308 may also report on large file uploads to a memory card or a remote host, changes to the operating system files or behavior, or other activities that may be relevant to a security profile.

Figure 4:
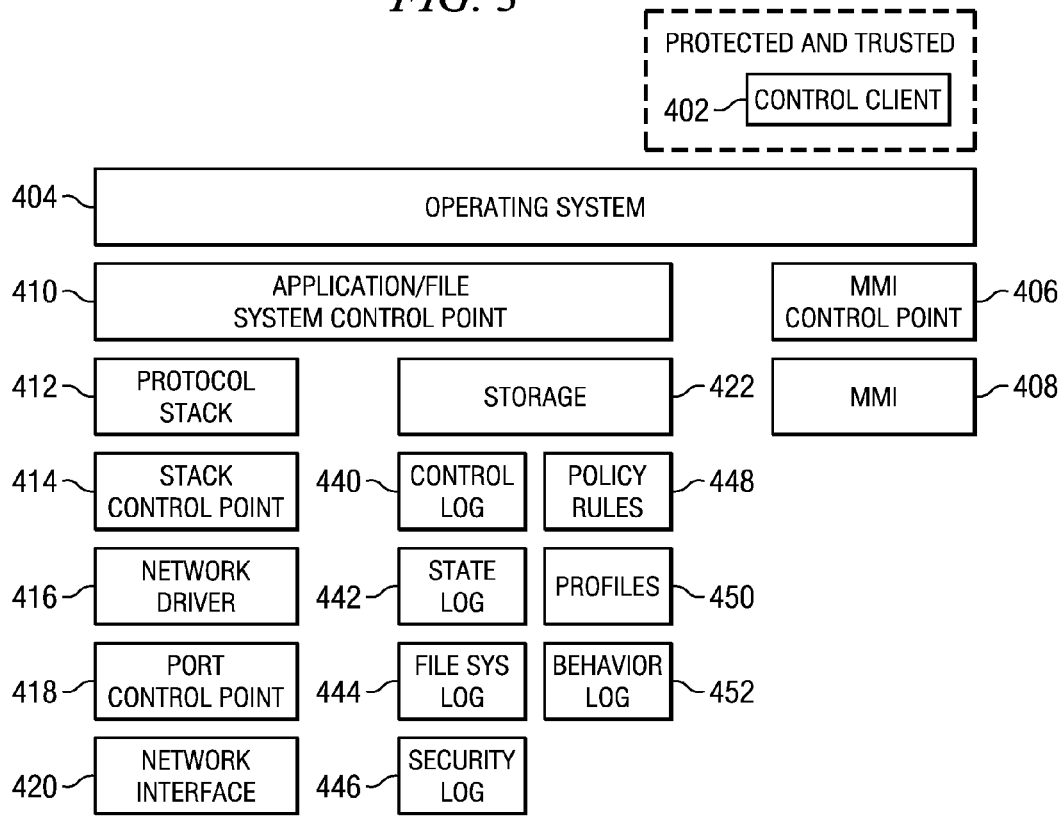
FIG. 4 provides an example mobile device software architecture.

FIG. 4 illustrates how control client functionality may be integrated with mobile device 104. In particular embodiments, the control client functionality may include a control client application 402 and one or more control points inserted to monitor data traversing the interfaces of the mobile device 104. For example, a man-machine interface (MMI) control point 406 may be inserted into the driver stack of the man-machine interface 408 to log keystroke data. An application/file system control point 410 may be inserted to monitor and log application level and file system commands. Additionally, stack control point 414 may be inserted in one or more network protocol stacks of the mobile device 104, while port control points 418 may be inserted at a different layer of the network protocol stack. In various embodiments, one or more of the control points may be implemented as drivers that are installed in the appropriate driver stacks of the mobile device. In some implementations, the control points may emulate the operation of higher layer and/or lower layer drivers and pass data on to the lower or higher layer native drivers. In some embodiments, a rule set may define what data is captured.

Control client application 402 may store the data collected by the control points in one or more log files stored on a storage device of the mobile device. For example, control client application 402 may store file system commands (such as open, save, delete, copy, rename, etc.) in file system log 344. Furthermore, control client application 402 may store keystroke data in behavior log 452. Still further, control client application 402 may store data relating to its own operation in control log 440.

The control client application 402 can provide some of all of the data to device management system 102, which may update one or more data objects that are associated with the mobile device 104 in a database. In this manner, a central device management system 102 can, for example, maintain an accurate image of the data storage device(s) of the mobile device 104, including the applications installed and the files stored on the mobile device. In various embodiments, control client application 402 may operate to provide this data in real-time, intermittently during periods of non-activity (e.g., such as when the mobile device is inserted into a charging cradle), in addition to, or at, periodic intervals. Still further, the data may be provided to the device management system 102 during a synchronization operation between the mobile device and the user's personal computer. In a particular embodiment, a synchronization utility hosted by the user's personal computer may be configured to transmit the data to the device management system 102. In addition, the control client application 402 may operate in one to a plurality of modes based on a set of rules or policies. Furthermore, the control client application 402 may also apply a rule set that determines what data is provided to the device management system 102, and/or when such data is transmitted.

In particular embodiments, the control client application 402 and the remote management server 102 may establish encrypted connections. For example, Virtual Private Network (VPN) tunneling and encryption may be used to secure the connection. In a particular implementation, mobile device 104 may include port-based VPN functionality to encrypt the connection between the control client application 402 and the remote management server 102.

Although the device management system 102 has been described as creating, storing, and accessing a mobile device profile object for each mobile device 104, in further implementations, the device management system 102 may maintain a virtual instance of the mobile devices 104, and interact with a control client application hosted on the physical instance of the mobile device to synchronize the state of the physical instance of the mobile device with the virtual instance of that mobile device. In one particular embodiment, the control client logs man-machine interface (MMI) data, file system commands, and other data characterizing usage of, and/or the actions performed on, the mobile device. Some or all of the log data is provided to the device management system 102, which can synchronize the state of the virtual instance of the mobile device.

In particular embodiments, a virtual instance of a mobile (wireless capable) device is a running instantiation of the associated actual physical mobile device (hereinafter also referred to as "physical instance") that can execute or operate in a virtualized execution environment. For example, a server may host a virtual machine that emulates the hardware (such as the microprocessor or controller) of the mobile device, allowing a copy of the mobile device operating system (hereinafter also referred to as "virtual operating system") to be run. Additionally, one or more applications (themselves or copies) installed on the actual mobile device can also run on the virtual operating system. The virtual instance of the mobile device may also include all or a subset of the file system image of the mobile device, as well as device configuration and settings. In one embodiment, the logged usage data transmitted from a control client 308 on the actual mobile device can be used to replay, using the virtual instance of the mobile device, the actions taken by a user on the actual mobile device for a desired period of time. Still further, a device management server, in some implementations, may support an interface that presents a rendered image of the mobile device and activatable man-machine interface that allows a user to input commands to, and otherwise interact with, the actual mobile device or the virtual instance of the mobile device.

Maintaining a virtual instance of a mobile device at device management system 102, or a server or database connected to the device management system 102, facilitates a variety of configuration, management, troubleshooting and/or security functions. For example, the virtual instance provides an administrator a detailed snapshot of the state of the mobile device. The virtual instance also allows an administrator to install a certificate on the virtual instance of the mobile device, without consuming computing resources of the physical instance of the mobile device. Furthermore, the virtual instance also allows an administrator to perform management operations, such as virus/malware scans, application/image certification, etc., on the virtual instance of the mobile device, without consuming computing resources of the physical instance of the mobile device.

In various embodiments, mobile devices 104 may include device management and/or data synchronization functionality. For example, mobile devices 104 may support the Open Mobile Alliance (OMA) Device Management (DM) protocol, and/or the OMA Data Synchronization (DS) protocol. OMA DM is a protocol specified by OMA for DM purposes, by the Device Management Working Group and the Data Synchronization Working Group. One such specification is OMA DM version 1.2, which is incorporated by reference herein. The OMA DM specification is designed for management of small mobile devices such as, by way of example, mobile phones, mobile smart phones, PDAs and palm top computers. The device management may support 1) provisioning (configuration of the device (including first time use), enabling and disabling features); 2) configuration (allowing changes to settings and parameters of the device); 3) software upgrades (providing for new software and/or bug fixes to be loaded on the device, including applications and system software); and 4) fault management (such as reporting errors from the device, querying about status of device). The device management generally takes place by communication between a server (which is managing the device) and the client (the device being managed). OMA DM is designed to support and utilize any number of data transports such as a) physically over both wireline (e.g., USB, RS-232) and wireless media (e.g., GSM, CDMA, Infrared, BlueTooth), and b) transport layers implemented over any of WSP (WAP), HTTP or OBEX or similar transports. The communication protocol is generally a request-response protocol. Authentication and challenge of authentication may be incorporated to ensure the server and client are communicating after proper validation. The communication may be initiated by the OMA DM server, asynchronously, using any of a variety of methods available such as, by way of example, a WAP Push or SMS. Once the communication is established between the server and client, a sequence of messages may be exchanged to complete a given device management task. OMA DM provides for alerts, which are messages that may occur out of sequence, and may be initiated by either server or client. Such alerts may be used to handle errors, abnormal terminations, etc.

Using OMA DM or another suitable protocol, the control client functionality discussed above can be installed on a mobile device. For example, a mobile device without the control client functionality can be provisioned and configured as follows. In a preliminary step, an administrator may create a management instance of the mobile device with a minimal configuration. The mobile device 104, in some implementations, may not be allowed access (or at least full access) to the enterprise's internal network, except for device registration and provisioning with the device management system 102. Suitable identifying information may include a device identifier, a user name, and the like. A user of the mobile device may then be directed to connect to the device management system 102 using, for example, a dial up connection, or a data connection with a WAP browser. The device management system 102, acting as an OMA DM server, may then interrogate the mobile device to learn one or more attributes (such as model number, serial number, operating system type and version, etc.), and provision and configure the mobile device. When the mobile device has been configured, the device management system 102 may further use the configuration and other information related to the mobile device to complete installation of a control agent on the mobile device.

In further implementations, all access to the enterprises's internal network may be denied until the mobile device 104 includes at least an installed control agent. For example, any attempt to access the enterprises's internal network without an installed control agent may result in denial of access and a prompt to connect to the device management system 102 directly for registration and provisioning. As such, the mobile device 104 may need to directly communicate with the device management system 102 using, for example, a dial up connection, a data connection with a WAP browser, or a separate VPN/SSL gateway.

In some implementations, even if the mobile device 104 includes an installed control agent, the mobile device 104 may still be denied access (or at least full access) to the enterprise's internal network. For example, as is discussed further below, in order to implement additional security measures, the mobile device 104 may be required to have a certificate installed on the mobile device 104 before some (or all) access is permitted to the enterprises's internal network. In some implementations, obtaining a certificate may be part of the registration process.

Obtaining Certificates for a Mobile Device

Mobile devices 104 can be configured to access various enterprise network services that are hosted by or on behalf of an enterprise. For example, with reference to FIG. 1, a given enterprise may include a Microsoft Exchange Server 112 with Exchange ActiveSync functionality. In some implementations, such enterprise network services may be accessed directly or through SSL/VPN/Firewall gateway 120. Mobile devices 104 may also host applications that are configured to access systems external to the enterprise network 110. Various differences between mobile devices and other computing systems (such as personal computers and laptops) present challenges to network administrators relative to network security. Users of mobile devices, for example, typically have much more control over the ability to install applications— even unauthorized applications. In addition, mobile devices communicate over communications channels, such as carrier networks, that an enterprise has little to no control of. Accordingly, a network administrator may not simply block a switch port to which a host raising security concerns is connected or to deny access to certain remote hosts.

In order to protect the enterprise network, some implementations may provide certificates to each of the mobile devices 104 before the mobile devices 104 may be allowed to access the enterprise network. The certificates may include any suitable digital certificate for verifying whether a mobile device 104 is authorized to access an enterprise network, such as X.509 certificates. In some implementations, the mobile device 104 may be denied access to the enterprise network until a certificate has been installed on the mobile device 104. For example, referring to FIG. 1, when the mobile device 104 attempts to access the enterprise network, the mobile device 104 may be interrogated (i.e., such as by being required to prove that the mobile device 104 has an installed certificate) in order to determine whether the mobile device 104 has a certificate installed. The mobile device 104 may be interrogated by any suitable apparatus connected to the enterprise network, or by any suitable program of instructions installed on the enterprise network.

If it is determined that the mobile device 104 does not have a certificate, the mobile device 104 may be denied access to some (or all) of the enterprise network. In some implementations, when the mobile device 104 is denied access to some portions of the enterprise network, the mobile device 104 may only be able to access the device management system 102 in order to register with the device management system 102. Other than the access granted in order to register with the device management system 102, the mobile device 104 may be denied access to any other portion of the enterprise network. In further implementations, when the mobile device 104 is denied access to all of the network enterprise, the mobile device 104 may have to set up a encrypted separate connection (i.e., such as through a SSL/VPN/Firewall gateway) with the device management system 102 in order to register the mobile device 104. As such, without a valid certificate, the mobile device 104 may not be able to access the protected enterprise network services on the enterprise network, such as the ActiveSync/Exchange server 112.

On the other hand, if it is determined that the mobile device 104 does include an installed certificate that is still valid, the mobile device 104 may be provided access to the enterprise network services. Therefore, requiring the mobile device 104 to have an installed certificate that provides evidence of the mobile device 104's authorization to access the network enterprise may provide additional security to the network enterprise, despite the fact that the mobile devices 104 cannot normally be controlled outside of the enterprise network.

Figure 5:
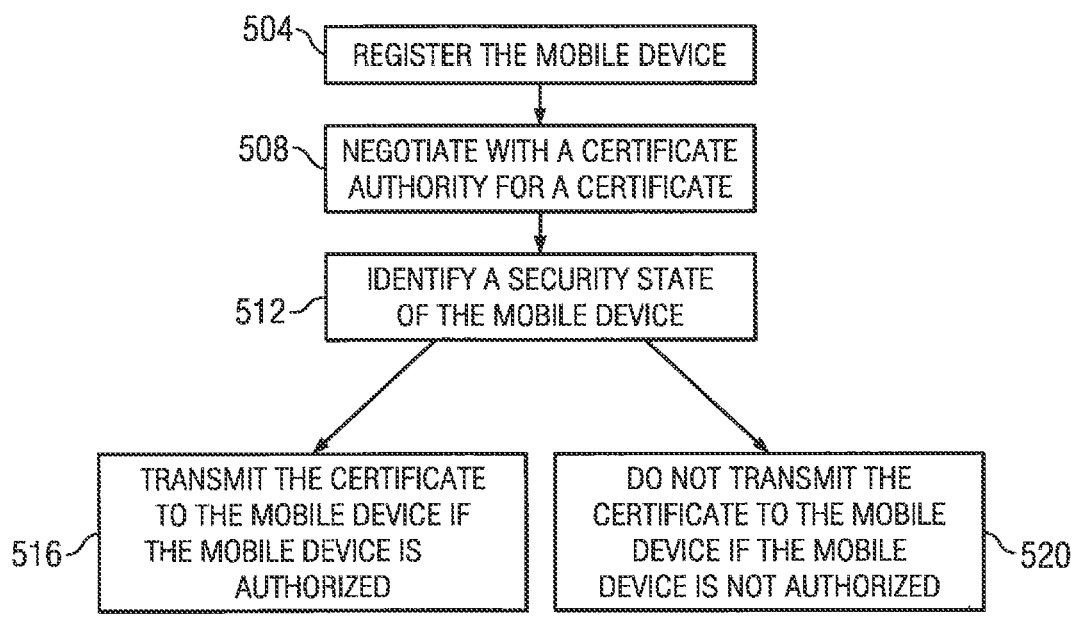
FIG. 5 is an example process flow for obtaining a certificate for a mobile device.

FIG. 5 provides a process flow for obtaining a certificate for a mobile device 104. In the implementation shown, the mobile device 104 is registered with the device management system 102 (504). After the mobile device 104 is registered with the device management system 102, the device management system 102 negotiates with a certificate authority (CA) for a certificate for the mobile device 104 (508). In some implementations, this negotiation occurs based on the device management 102 imitating (or spoofing) the mobile device 104. In further implementations, a Simple Certificate Enrollment Protocol (SCEP) may be used for this negotiation. In additional implementations, any other suitable communication protocols may be used for the negotiation. Once the device management system 102 receives the certificate, the device management system 102 may identify a security state of the mobile device 104 (512). In one implementation, the security state may include a determination regarding whether or not the mobile device 104 is authorized to have (or receive) the certificate (i.e., authorized to access the enterprise network). If the mobile device 104 is authorized to have (or receive) the certificate, the certificate may be transmitted to the mobile device (516). As such, the mobile device 104 may install the certificate and proceed to access the enterprise network services of the enterprise network. However, if the mobile device 104 is not authorized to have (or receive) the certificate, the certificate may not be transmitted to the mobile device 104. Accordingly, the mobile device 104 may not access the enterprise network services of the enterprise network.

As is discussed above, the device management system 102 (and not the mobile device 104) negotiates with the certificate authority in order to obtain a certificate for the mobile device 104. Thus, the mobile device 104 does not need to have the capability of communicating with the certificate authority. Accordingly, if a particular protocol is needed in order to communicate with the certificate authority, such as SCEP, the mobile device 104 does not need to have a SCEP client and/or the capability of communicating using such a protocol. Additionally, the mobile device 104 is also prevented from contacting the certificate authority—thereby preventing the process of obtaining a certificate from being mishandled by an inexperienced mobile device user.

In some implementations, the device management system 102 negotiates with the certificate authority using SCEP. SCEP is a public key infrastructure (PM) communication protocol which leverages existing technology by using PKCS#7 and PKCS#10 over Hypertext Transfer Protocol (HTTP). Additional information regarding SCEP may be found in the Internet Engineering Task Force Internet-Draft entitled "Cisco Systems' Simple Certificate Enrollment Protocol draft-nourse-scep-20" and dated Nov. 30, 2009, which is incorporated herein by reference. According to certain implementations, the device management system 102 may negotiate with the certificate authority using SCEP by first imitating the mobile device 104. For example, the device management system 102 may imitate the mobile device 104 by generating a private key and a public key for the mobile device 104. In such an example, the device management system 102 may use the mobile device profile object in order to generate the keys for the mobile device 104. Once the private key and public key for the mobile device 104 have been generated by the device management system 102, the private key and the public key may be transmitted to the certificate authority according to both PKCS#10 and PKCS#7 in order to request a certificate for the mobile device 104. In some implementations, this request for a certificate may further include the distinguished name of the mobile device 104, a challenge password attribute, and any other suitable information. After receiving the certificate request, the certificate authority may transmit the certificate back to the device management system 102. In some implementations, this response from the certificate authority may include the certificate authority's public key, the certificate authority's name, and a serial number. In some implementations, this negotiation process may occur through a web or HTML/HTTP-based interface. Negotiation with the certificate authority may end once the device management system 102 obtains the certificate for the mobile device 104.

After the device management system 102 receives the certificate for the mobile device 104, the certificate may be transmitted to the mobile device 104 for installation by the control client 308. In some implementations, the device management system 102 may decrypt the certificate prior to transmitting the certificate to the mobile device 104. In other implementations, the device management system 102 may transmit the encrypted certificate to the mobile device 104, along with the private key and/or public key needed for the decryption. In particular implementations, the device management system 102 may cache the certificate, private key, and public key before transmitting one or more of these to the mobile device 104. In such implementations, the device management system 102 may transmit the certificate, private key, and/or public key to the mobile device 104 more than once in order to enable different services for the mobile device 104. In other implementations, the device management system 102 may not cache the certificate, private key, and public key before transmitting one or more of these to the mobile device 104.

In further implementations, prior to transmitting the certificate to the mobile device 104, the device management system 102 may access a database to identify a security state of the mobile device. For example, each mobile device profile object may include information regarding a security state of the mobile device 104. This security state may include a determination regarding whether or not the mobile device 104 is authorized to have (or receive) the certificate (i.e., authorized to access the enterprise network). In one implementation, this determination may be made by the device management system 102. The mobile device 104 may not be authorized to have (or receive) the certificate if, for example, the mobile device 104 includes a banned application, if the mobile device 104 has a different SIM card than was previously recorded in the profile (such as an unknown SIM card), or if the mobile device profile object indicates any other information that may prevent authorization (such as information regarding whether the mobile device 104 has performed any other banned processes).

In some implementations, the device management system 102 may only transmit the certificate to the mobile device 104 if the mobile device 104 is authorized to have (or receive) the certificate. For example, prior to transmitting the certificate to the mobile device 104, the device management system 102 may access the mobile device profile object in the database in order to receive an indication regarding the security state (i.e., whether or not the mobile device 104 is authorized to have (or receive) the certificate) of the mobile device 104. In such implementations, allowing the mobile device 104 to access the enterprise network under such circumstances may be an unacceptable security risk. As such, the device management system 102 may not transmit the certificate to the mobile device 104, rendering the mobile device 104 unable to access the enterprise network and the enterprise network services.

One the other hand, if the security state indicates that the mobile device 104 is authorized to have (or receive) the certificate, the certificate may be transmitted to the mobile device 104. Once the mobile device 104 receives the certificate, it may be installed on the mobile device 104. This installation enables the mobile device 104 to access the enterprise network and the enterprise network services.

Although the device management system 102 has been described as accessing the security state of the mobile device 104 prior to transmitting the certificate, the security state may be accessed at any suitable time. For example, the device management system 102 may access the security state prior to negotiating with the certificate authority. As such, if the security state indicates that the mobile device 104 is not authorized to have (or receive) a certificate, the device management system 102 may not even begin the process of obtaining a certificate for the mobile device 104.

Managing Certificates

In some implementations, even after the mobile device 104 has received the certificate, the device management 104 may continue to monitor the mobile device 104's mobile device profile object in order to determine whether the certificate should be revoked, rendered invalid, or not renewed for later use. For example, the device management system 102 may revoke, invalidate, or not renew the installed certificate if it is determined that the mobile device 104 has installed a banned (or blacklisted) application, changed its SIM card, or performed any other banned process.

In particular implementations, the device management system 102 may revoke a certificate by transmitting various commands to the control client 308, causing the mobile device 104 to uninstall the certificate and transmit it back to the device management system 102. Once a certificate has been revoked, the device management system 102 may refuse to give the certificate back to the mobile device 104 (or refuse to obtain a new certificate for the mobile device 104) until it has been determined that the mobile device 104 is once again authorized to have the certificate.

In some implementations, the device management system 102 may render the mobile device 104's certificate invalid. For example, the device management system 102 may signal the security state of a mobile device 104 to the enterprise network services (e.g., email servers, SSL/VPN Servers, and other applications), which may then admit or deny access to the mobile device 104. In one implementation, the device management system 102 may be configured to set one or more security profile values in a data object associated with the mobile device 104. These values can be distilled down to one Boolean value, such as an accept or admit (True/False) value. An enterprise application may be configured to access this parameter value when deciding whether to accept or reject the requests or other messages of the mobile device 104. In other implementations, the mobile device management system 102 may transmit blacklists or whitelists to various enterprise applications. These lists can be consulted by an exchange server 112, an SSL/VPN gateway 120 and/or an application server 114, for example, when deciding whether to accept or reject the requests or other messages of the mobile device 104. In this manner, the mobile device 104 may be prevented from accessing the network enterprise services despite having an installed certificate. Other implementations are possible. For example, mobile device management system 102 may maintain a variety of attribute values for mobile device 104. A given application can be configured via a set of APIs to access one to a combination of these attributes when deciding to accept/reject access to a mobile device 104.

In further implementations, the device management system 102 may conduct various other operations when the device management system 102 determines that the mobile device 104 has performed unauthorized actions or that the mobile device 104 is no longer authorized to access the enterprise network. For example, if an application is unauthorized, but does not present security issues, the device management system 102 may be configured to transmit a notification or warning to the user of the mobile device 104 that the application is unauthorized and, therefore, will not be supported by the enterprise's information technology (IT) department. As another example, instead of just revoking, invalidating, or not renewing a certificate, the device management system 102 may cause the entire storage device of the mobile device 104 to be wiped. In such an example, a wipe command may be transmitted to the control client 308 hosted on the mobile device 104, which causes the entire storage device to be erased. This wipe command may be used if a known virus or other malicious application is detected, if a banned application is detected, if the SIM card has been changed, or for any other suitable reason.

As is discussed above, the device management system 102 may enact various procedures if the mobile device 104 is determined to be unauthorized to access the enterprise network. In further implementations, the device management system 102 may also prevent a mobile device 104 from performing certain actions that may result in the mobile device 104 becoming unauthorized. For example, in some implementations, mobile device management system 102 can operate in connection with control clients 308 installed on mobile devices 104 to block an application from launching—that is, prevent it from being started. As such, the device management system 102 may prevent the launching of any banned application.

As a further example, if the mobile device 104 has received a certificate from the device management system 102, the device management system 104 may manage the mobile device 104 in order to prevent the mobile device 104 from installing certain applications. For example, a control client 308 may detect an attempt to install an application, and transmit information regarding the application to the device management system 102. If the application is unauthorized (i.e., such as being a banned application), the device management system 102 may instruct the control client 308 to prevent the application from being installed on the mobile device 104.

Mobile Device Profile Objects

As discussed above, device management system 102 may maintain or access mobile device profile objects for corresponding mobile devices 104 that have been registered. In one implementation, the mobile device profile object may be stored by the device management system 102 in a directory server 118, such as, for example, a LDAP directory. As such, in order to access the mobile device profile object, the device management system 102 may request that the mobile device profile object be transmitted from the LDAP directory to the device management system 102. Mobile device profile information may include the make and model of the mobile device, an identifier of the operating system and version installed on the mobile device, serial numbers, and Media Access Control (MAC) address (or other unique identifiers associated with one or more communications interfaces of the mobile device). Mobile device profile information may also include pointers to log data received from a control client 308 installed on a mobile device 104. Mobile device profile information may further include an image of the file system maintained on the mobile device 104, such as all applications and application files stored on the mobile device 104. This information may be made available to both users and network administrators for various purposes. In a further implementation where a virtual instance of each mobile device 104 is being run, the device management system 102 may access any needed information by accessing the virtual instance of the mobile device running on any server, such as the directory server 118.

The device management system 102 may imitate the mobile device 104 based on information in the mobile device profile objects. In some implementations, the imitation of the mobile device 104 may be based on the following information included in the mobile device profile objects:

- Name—brief text that identifies the mobile device 104's SCEP settings
- Description—additional text that clarifies the purpose of the mobile device 104's SCEP settings.
- URL—the address of the certificate authority
- Subject—an X.500 name represented as an array of OID and value
- Challenge type—specifies the type of challenge to use for a certificate revocation initiated by the mobile device 104
- Challenge—a pre-shared secret the certificate authority can use to identify the request or user
- Challenge URL—the URL of the trust point defined for the certificate authority
- User name—the user name for the certificate authority
- Password—the password for the certificate authority.
- CN type—the format for the common name to be constructed for the certificate
- Key size—a key size (1024 or 2048)
- Key usage—one or more acceptable uses of the key (i.e., signing and/or encryption)
- Fingerprint—further security verification.

In further implementations, the mobile device profile object may further include the following information for allowing access to various enterprise network services, such as ActiveSync/Exchange:

- Name—brief text that identifies this group of exchange settings
- Description—additional text that clarifies the purpose of this group of exchange setting
- Server address—the address of the exchange server
- Use SSL—a selection regarding the use of secure connections
- Domain—the domain configured for the ActiveSync/Exchange server
- ActiveSync user name—the user name to be used for ActiveSync users
- ActiveSync user email—the email address to be used for ActiveSync users
- ActiveSync password—the password to be used for ActiveSync users
- Identity certificate—the SCEP entry created for supporting ActiveSync/Exchange
- Using sentry stand alone—this option facilitates matching between the ActiveSync device and the device management system 102
- Choose the items to synchronize—the outlook items to be synchronized: context, calendar, email, text
- Email Sync-Down-Load the past—the amount of email to synchronize (may be selected from a drop down list)
- ActiveSync settings—settings for the ActiveSync database
- Peak times—the preferred synchronization approach for peak times
- Off-peak times—the preferred synchronization approach for off-peak times
- Use above settings while roaming—whether to apply synchronization preferences while roaming
- Send/receive when clicking send—whether queued messages should be sent and received whenever the user sends a message
- Peak days—the days that should be considered peak days
- Start time—the beginning of the peak period for all peak days
- End time—the end of the peak period for all peak days
- Apply to labels—the group of settings to be associated with the selected labels
- Search devices—the phone number or user ID to find smart phones to which certain polices are applied to
- Applied devices—the group of settings to be associated with the selected smart phones.

In further implementations, the mobile device profile object may include any other suitable information. In further implementations, this information may be accessed from a virtual instance of a mobile device. In particular implementations, the foregoing information may be entered by any suitable process. For example, the user of the mobile device 104 may enter the information, and then the information may be transmitted to the device management system 102 by the control client 308 of the mobile device 104. As another example, the information may be entered by a network administrator when the mobile device 104 is initially set up to be used on the enterprise network.

The present disclosure encompasses all changes, substitutions, variations, alterations, and modifications to the example embodiments described herein that a person having ordinary skill in the art would comprehend. Similarly, where appropriate, the appended claims encompass all changes, substitutions, variations, alterations, and modifications to the example embodiments described herein that a person having ordinary skill in the art would comprehend.

To aid the Patent Office and any readers of any patent issued on this application and interpreting the claims appended hereto, Applicants wish to note that they do not intend any of the appended claims to invoke Paragraph 6 of 35 U.S.C. §112 as it exists on the date of filing hereof unless "means for" or "step for" are used in the particular claim.

What is claimed is:

1. A method, comprising:
   receiving, at a mobile device management system, an indication of a request from a mobile device for a certificate to access an enterprise network, wherein the mobile device includes a control agent that is configured to interact with the mobile device management system via a communications network;
   accessing, by the mobile device management system, a profile associated with the mobile device;
   transmitting, by the mobile device management system, a certificate request to a certificate authority on behalf of the mobile device, wherein the certificate request is generated by the mobile device management system based at least in part on the profile of the mobile device;
   receiving, at the mobile device management system, the certificate for the mobile device in response to the certificate request;
   determining, by the mobile device management system, that the mobile device is authorized to receive the certificate based at least in part on a security state associated with the mobile device; and
   transmitting, by the mobile device management system, the certificate to the control agent for installation on the mobile device, based at least in part on the determination that the mobile device is authorized to receive the certificate.

2. The method of claim 1, wherein the certificate request to the certificate authority comprises one or more simple certificate enrollment protocol (SCEP) messages to the certificate authority.

3. The method of claim 1, further comprising, before transmitting the certificate, accessing a database to identify the security state of the mobile device.

4. The method of claim 1, wherein the mobile device management system further generates a public key and a private key for the mobile device; and wherein the certificate request transmitted to the certificate authority comprises a certificate signing request that includes the public key.

5. The method of claim 4, wherein transmitting the certificate to the control agent hosted on the mobile device comprises:
   decrypting the certificate using the private key; and
   transmitting the decrypted certificate to the control agent.

6. The method of claim 1, wherein receiving the profile for the mobile device comprises:
   requesting the profile from a Lightweight Directory Access Protocol (LDAP) server; and
   receiving the profile from the LDAP server.

7. The method of claim 1, wherein determining whether the mobile device is authorized to receive the certificate comprises determining that the mobile device is not authorized to receive the certificate if the mobile device includes one or more banned applications.

8. The method of claim 1, wherein determining whether the mobile device is authorized to receive the certificate comprises determining that the mobile device is not authorized to receive the certificate if the mobile device includes an unknown subscriber identification module (SIM) card.

9. The method of claim of 1, further comprising:
   after transmitting the certificate to the mobile device, monitoring the profile for one or more changes;
   based on the changes, determining whether the mobile device is authorized to have the certificate; and
   revoking the certificate if it is determined that the mobile device is not authorized to have the certificate.

10. One or more computer-readable tangible and non-transitory storage media encoding software that is operable when executed to cause a mobile device management system to:
    receive an indication of a request from a mobile device for a certificate to access an enterprise network, wherein the mobile device includes a control agent that is configured to interact with the mobile device management system via a communications network;
    access a profile associated with the mobile device;
    transmit a certificate request to a certificate authority on behalf of the mobile device, wherein the certificate request is generated based at least in part on the profile of the mobile device;
    receive the certificate for the mobile device in response to the certificate request;
    determine, that the mobile device is authorized to receive the certificate based at least in part on a security state associated with the mobile device; and
    transmit the certificate to a control agent hosted on the mobile device for installation on the mobile device, based at least in part on the determination that the mobile device is authorized to receive the certificate.

11. The media of claim 10, wherein the certificate request to the certificate authority comprises one or more simple certificate enrollment protocol (SCEP) messages to the certificate authority.

12. The media of claim 10, wherein the software is further operable when executed to access a database to identify the security state of the mobile device before transmitting the certificate.

13. The media of claim 10, wherein the software that is operable when executed further causes the mobile device management system to generate a public key and a private key for the mobile device; and
    wherein the certificate request transmitted to the certificate authority comprises a certificate signing request that includes public key.

14. The media of claim 13, wherein the software operable when executed to transmit the certificate to the control agent hosted on the mobile device comprises software operable when executed to:
    decrypt the certificate using the private key; and
    transmit the decrypted certificate to the control agent.

15. The media of claim 10, wherein the software operable when executed to receive the profile for the mobile device comprises software operable when executed to:
    request the profile from a Lightweight Directory Access Protocol (LDAP) server; and
    receive the profile from the LDAP server.

16. The media of claim 10, wherein the software operable when executed to determine whether the mobile device is authorized to receive the certificate comprises software operable when executed to determine that the mobile device is not authorized to receive the certificate if the mobile device includes one or more banned applications.

17. The media of claim 10, wherein the software operable when executed to determine whether the mobile device is authorized to receive the certificate comprises software operable when executed to determine that the mobile device is not authorized to receive the certificate if the mobile device includes an unknown subscriber identification module (SIM) card.

18. The media of claim of 10, wherein the software is further operable when executed to:

after transmitting the certificate to the mobile device, monitor the profile for one or more changes;

based on the changes, determine whether the mobile device is authorized to have the certificate; and revoke the certificate if it is determined that the mobile device is not authorized to have the certificate.

19. An apparatus comprising:

a mobile device management system that includes one or more processors; and a memory coupled to the processors and tangibly storing one or more instructions, the processors operable when executing the instructions to:

receive an indication of a request from a mobile device for a certificate to access an enterprise network, wherein the mobile device includes a control agent that is configured to interact with the mobile device management system via a communications network;

access a profile associated with the mobile device;

transmit a certificate request to a certificate authority on behalf of the mobile device, wherein the certificate request is generated based at least in part on the profile of the mobile device;

receive the certificate for the mobile device in response to the certificate request;

determine, that the mobile device is authorized to receive the certificate based at least in part on a security state associated with the mobile device; and transmit the certificate to a control agent hosted on the mobile device for installation on the mobile device, based at least in part on the determination that the mobile device is authorized to receive the certificate.

20. The apparatus of claim 19, wherein the certificate request to the certificate authority comprises one or more simple certificate enrollment protocol (SCEP) messages to the certificate authority.

21. The apparatus of claim 19, wherein the processors are further operable when executing the instructions to access a database to identify the security state of the mobile device before transmitting the certificate.

22. The apparatus of claim 19, wherein the processors are further operable when executing the instructions to generate a public key and a private key for the mobile device; and wherein the certificate request transmitted to the certificate authority a certificate signing request that includes the public key.

23. The apparatus of claim 22, wherein the processors operable when executing the instructions to transmit the certificate to the control agent hosted on the mobile device comprise processors operable when executing the instructions to:

decrypt the certificate using the private key; and transmit the decrypted certificate to the control agent.

24. The apparatus of claim 19, wherein the processors operable when executing the instructions to receive the profile for the mobile device comprise processors operable when executing the instructions to:

request the profile from a Lightweight Directory Access Protocol (LDAP) server; and receive the profile from the LDAP server.

25. The apparatus of claim 19, wherein the processors operable when executing the instructions to determine whether the mobile device is authorized to receive the certificate comprise processors operable when executing the instructions to determine that the mobile device is not authorized to receive the certificate if the mobile device includes one or more banned applications.

26. The apparatus of claim 19, wherein the processors operable when executing the instructions to determine whether the mobile device is authorized to receive the certificate comprise processors operable when executing the instructions to determine that the mobile device is not authorized to receive the certificate if the mobile device includes an unknown subscriber identification module (SIM) card.

27. The apparatus of claim of 19, wherein the processors are further operable when executing the instructions to:

after transmitting the certificate to the mobile device, monitor the profile for one or more changes;

based on the changes, determine whether the mobile device is authorized to have the certificate; and revoke the certificate if it is determined that the mobile device is not authorized to have the certificate.

* * * * *